United States Patent [19]
LaBudde

[11] Patent Number: 4,696,062
[45] Date of Patent: Sep. 22, 1987

[54] FIBER OPTIC SWITCHING SYSTEM AND METHOD

[76] Inventor: Edward V. LaBudde, 1768 Upper Ranch Rd., Westlake Village, Calif. 91362

[21] Appl. No.: 754,643

[22] Filed: Jul. 12, 1985

[51] Int. Cl.$^4$ .............................................. H04B 9/00
[52] U.S. Cl. ................................. 455/612; 350/96.15; 356/138
[58] Field of Search ............... 350/96.15, 96.16, 96.18, 350/96.20; 356/73.1, 138, 153, 399, 400, 152; 250/201; 455/612, 600

[56] References Cited

U.S. PATENT DOCUMENTS

| | | | |
|---|---|---|---|
| 3,781,546 | 12/1973 | Christian et al. | 250/201 |
| 4,204,742 | 5/1980 | Johnson et al. | 350/96.2 |
| 4,452,506 | 6/1984 | Reeve et al. | 350/96.15 |
| 4,474,469 | 10/1984 | Abe | 356/73.1 |

*Primary Examiner*—Joseph A. Orsino, Jr.
*Attorney, Agent, or Firm*—Koppel & Harris

[57] ABSTRACT

A fiber optic switching system and method is described which is capable of rapidly switching among a number of closely spaced optical rods for optical connection with a communications channel, while alleviating alignment problems caused by vibration and similar environmental conditions. Focusing lenses are moved relative to stationary multirod cables, and brought into coarse alignment with desired rods in each cable in a programmed switching sequence. At each coarse lens position a fine alignment is achieved between the lens and rod by directing an optical alignment beam along the focal axis of the lens, reflecting the beam off the rod, and sensing the portion of the alignment beam which is reflected back through the lens as an indication of the misalignment. The misalignment detectors form part of a servomechanism that rapidly adjusts the lens position in response to detected misalignments to bring the lens into alignment with the desired rod. The alignment beam is preferably generated at a different frequency from the data signal, and beam directing elements associated with the servomechanism discriminate between the data and alignment beams so that the data beam is transmitted to a communications channel while the alignment beam is forwarded to the lens position control apparatus.

30 Claims, 3 Drawing Figures

FIBER OPTIC SWITCHING SYSTEM AND METHOD

BACKGROUND OF THE INVENTION

1. Field of the Invention

This invention relates to fiber optic communications, and more particularly to a system and method for rapidly switching among a number of optical rods in a multirod cable for optical connection with a communications channel.

2. Description of the Prior Art

In recent years optical technology has emerged as a primary vehicle for communications systems, such as telephone networks, in which rapid switching must be accomplished among large numbers of different lines. Optical communications cables typically have a relatively large number of separate rods, each of which is capable of carrying a discrete optical signal. (The term "rod" is used herein to indicate a discrete signal line, and can consist of either a single optical fiber or a bundle of fibers. The term "optical" is used in the broad sense to refer not only to visible light, but also to adjacent areas of the electromagnetic spectrum.) It is often necessary to optically interconnect two or more such cables, and to be able to rapidly switch the interconnection among the various rods of each cable. For example, time-based multiplexing techniques in common use enable a large number of different conversations to be transmitted over a single communications channel by obtaining short samples of each conversation in sequence, and interleaving the samples on the communications channel. The discrete samples are separated at the opposite end of the channel and used to reconstruct the original conversations.

In order to couple a cable having a number of optical rods with a communications channel, a lens has typically been positioned adjacent the end of the cable to direct light emitted from the ends of selected rods onto the channel for transmission to a desired location. Switching among the different rods in the cable has been accomplished by holding the lens stationary and physically indexing the cable so that the desired rod is moved into alignment with the focal axis of the lens. As rapid switching such as multiplexing progresses, the cable is repeatedly indexed so that each desired rod is sequentially brought into alignment with the lens.

This method has resulted in some serious problems in the ability to obtain accurate signals for transmission, and to rapidly switch among the various rods in the cable. It is difficult to maintain mechanical alignment between the fixed lens and movable cable, and alignments can be adversely effected by variables such as thermal expansion or shrinkage. Such systems are generally difficult to install, and do not exhibit a particularly long working life. In high vibration environments such as aircraft, the optical components are subject to serious misalignment from motor vibration.

It is also difficult to achieve high speed switching with prior optical systems. Whereas the optical rods are typically 10–20 microns in diameter, a much larger spacing has been required between the rods to accommodate the necessary mechanical motion. The spacing between rods is typically in the order of 0.1 inch, or approximately 3,000 microns. This results in the need for substantial displacements of the cable during switching, and an accompanying loss of switching speed.

SUMMARY OF THE INVENTION

In view of the above problems associated with the prior art, it is an object of this invention to provide a novel and improved fiber optic switching system and method which is capable of rapidly switching among the optical rods of a multirod cable, and of achieving a more reliable alignment between the rods and an associated communications channel than has been attained in prior art systems.

Another object is the provision of such a system and method which operates effectively with a much smaller spacing between adjacent rods than in the prior art, and is thereby capable of more rapid switching.

Yet another object is the provision of such a system and method which is durable, relatively easy to install, alleviates many of the previously encountered initial and environmental alignment problems, and is capable of handling large numbers of rods in the cables which it services.

In the accomplishment of these and other objects of the invention, a fiber optic switching system is provided with a lens which is adapted to focus optical radiation emitted from a selected rod in a multirod cable to a beam which is suitable for transmission by a communications channel, and means for adjusting the lens position relative to the rod. A position control means governs the position adjustment mechanism so that the lens is sequentially positioned at the approximate locations of desired rods in the cable. Radiation transmitted through the lens from a desired rod is used to detect misalignments between the lens and rod. Any detected misalignments are coupled back to the lens adjustment means to adjust the lens position in a manner that opposes the detected misalignments, thereby rapidly bringing the lens and rod into alignment.

In a preferred embodiment a separate alignment radiation beam is generated and directed substantially along the focal axis of the lens onto the desired rod. At least a portion of the alignment beam which is reflected off the rod and back through the lens is directed to the misalignment detection means, which is responsive to the reflected radiation pattern to detect misalignments between the rod and lens. The alignment beam is preferably generated at a different frequency from the communications channel frequency, and the means for directing the reflected alignment beam is adapted to discriminate between that beam and a channel signal. The wavelengths of the alignment beam and channel signal are approximately 0.82 and 1.3 microns, respectively, in one embodiment.

In addition to rapidly correcting x-y misalignments, the system includes means for detecting z-axis misalignments and for adjusting the lens three-dimensionally. The means for detecting z-axis misalignments preferably includes a wavefront detector which gives an indication of the reflected alignment beam focusing; this in turn indicates misalignments in the spacing between the lens and rod. The numeric aperture of the lens is preferably greater than that of the rods to enhance the gathering of reflected alignment radiation.

The movable lens, lens adjustment means and misalignment detection means are in effect coupled as a negative feedback circuit for the lens position control. The position control means is pre-programmed to coarsely position the lens at a plurality of selected rods in a programmed sequence, with the feedback circuit providing fine lens position control at each sequential lens position. With this system the spacings between adjacent rods can be on the same order of magnitude as the rod diameters, preferably about 10–20 microns. This provides a much closer bunching of the rods, so that only a relatively small adjustment in the lens position is necessary to switch from one rod to the other. Very rapid switching can be achieved as a result. It is also possible to provide a highly effective switching mechanism between two multirod cables, each including a large number of rods. The active lens position control mechanism substantially eliminates the adverse effects of environmental vibrations, temperature changes and initial alignment problems encountered in the prior art.

Further features and advantages of the invention will be apparent to those skilled in the art from the following detailed description of a preferred embodiment, taken together with the accompanying drawings, in which:

DETAILED DESCRIPTION OF A PREFERRED EMBODIMENT

The present invention takes a radical departure from the prior art approach of mechanically indexing a multirod optical cable with somewhat gross position adjustments relative to a fixed focusing lens. By contrast, the present invention keeps the cables fixed and moves the lenses in a series of high precision, rapid movements with greatly improved switching times and other operating characteristics.

Figure 1:
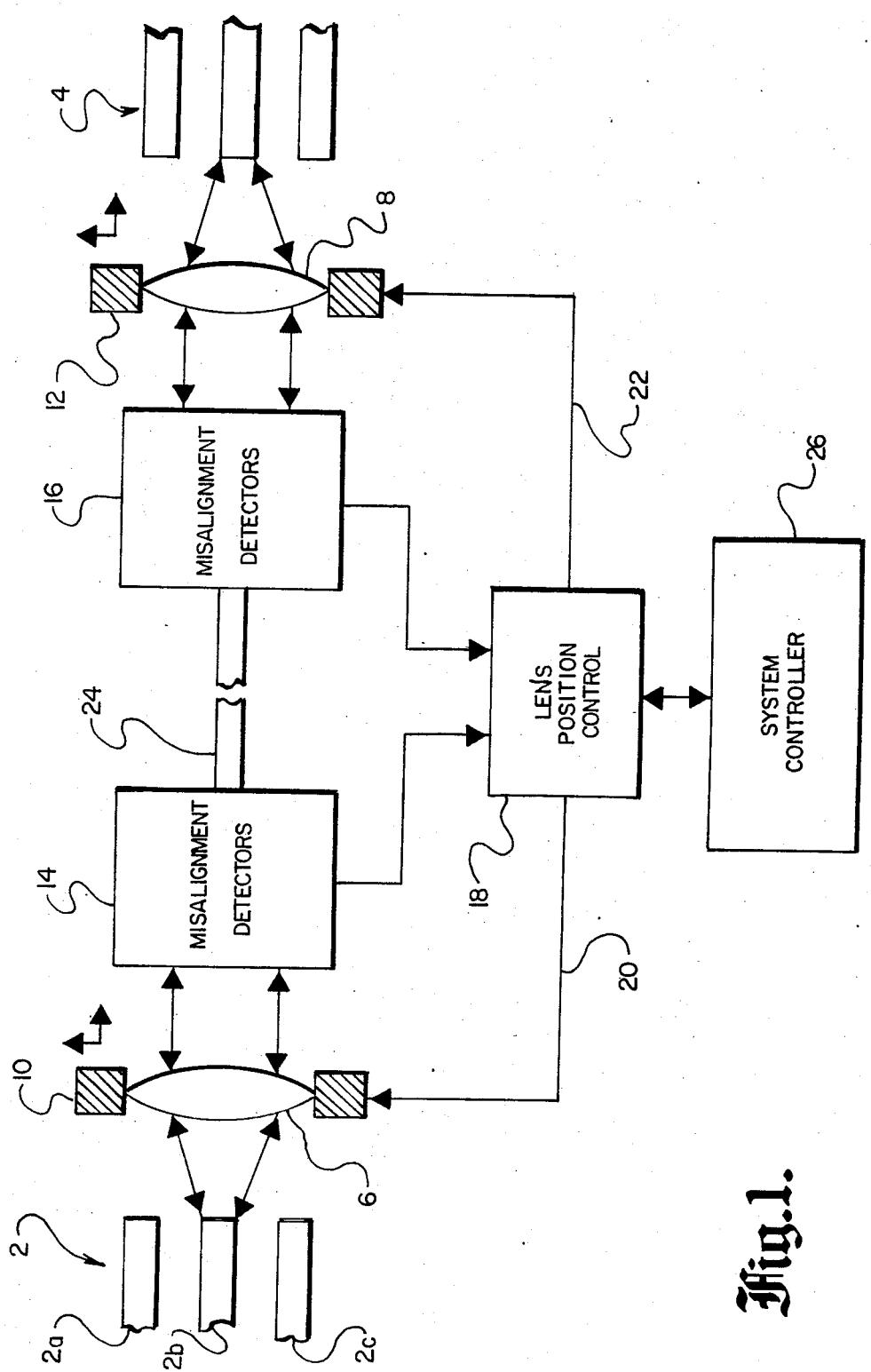
FIG. 1 is a block diagram showing the principal components of a two-way communications system constructed in accordance with the invention.

An overall block diagram of an optical communications system which uses this novel approach is shown in FIG. 1. It may be assumed that two-way communication is desired between two multirod cables 2 and 4. Cable 2 includes optical rods 2a, 2b, 2c and numerous other rods which are not shown. Cable 4 is of similar construction, and includes rods 4a, 4b and 4c. The rod diameters are preferably in the order of 10–20 microns, with spacings between adjacent rods in the same order of magnitude. Although the rods of each cable are illustrated in a linear arrangement, in practice each cable would normally be round with the rods generally evenly distributed over the entire cable cross-section.

Focusing lenses 6 and 8 are positioned adjacent the ends of cables 2 and 4, respectively, and are held in place by means of track and focus motors 10 and 12. The lenses are not drawn to scale for simplicity; in actual practice the lens diameters would be in the order of 2–3 millimeters, or over 100 times the rod diameters. The motors are capable of making precise adjustments to the positions of their respective lenses in the x (into the page), y (vertical) and z (horizontal) directions. It is by means of these adjustments that the lens is moved from one rod to the other, and precisely aligned with any desired rod. The numeric apertures of the lenses should be relatively high, greater than those of the rods, to maximize the collection of light emitted from the ends of the rods. The numeric apertures of the lenses are preferably in the range of 0.4–0.5, as compared with typical numeric apertures for the rods of 0.10–0.15. This high numeric aperture, however, limits the depth of focus for the lenses, which accordingly should be positioned closely adjacent the ends of the rods. Again, the spacing between the lenses and their respective rods is not shown to scale for purposes of simplification.

Lenses 6 and 8 focus light emitted from their respective rods into beams which are directed onto misalignment detectors 14 and 16, respectively. These detectors sense misalignments between the lenses and rods in the x, y and z directions, and deliver signals indicating such misalignments to a lens position control mechanism 18. This mechanism processes the misalignment signals to produce position correction signals which are transmitted over lines 20 and 22 to motors 10 and 12, respectively. The position control signals cause the lens motors to move their respective lenses in a direction that opposes the detected misalignments. The misalignment detectors continue to monitor the lens positions relative to their respective rods, and the lens position control modifies its output signals accordingly as the lenses approach precise alignment so that a fine position control is achieved over the ultimate lens position. In effect negative feedback circuits are established which progressively bring the lenses into very precise alignment with their intended rods.

A communications channel 24, which itself may be a multirod cable, links the cables 2 and 4. Light emitted by a rod in either of these cables is focused by its respective lens and directed onto channel 24, which transmits it to the lens for the other cable where it is focused onto the desired rod at that end. The system is capable of communicating in either direction, and the two lenses 6 and 8 can be positioned so that any rod in cable 2 can communicate via the communications channel with any rod in cable 4.

The initial positioning of the lenses is governed by a system controller 26. The system controller includes a microprocessor which stores the x-y locations of each rod within the two cables. The rod locations may be identified initially by scanning the lenses over the ends of their respective cables, directing an alignment beam through each lens and onto the ends of the cables as described hereinafter, and detecting the approximate rod positions as the scanning progresses by sensing the portions of the alignment beam which are reflected off the ends of the rods and back through the lens to the misalignment detectors.

The system controller 26 thereafter acts as a coarse position controller, governing the lens motors to move the lenses into approximate alignment with selected rods in a desired programming sequence. For example, in a multiplexing operation a lens would be rapidly moved from rod to rod, obtaining optical samples from each of its respective rods and directing the samples onto the communications channel 24. At the opposite end of the channel the other lens would be moved in a similar fashion from rod to rod so that all of the samples from the rods at one end are transmitted to corresponding rods at the opposite end. In this manner a large number of separate communications can be transmitted along the single communications channel during the same time period.

As each lens is brought into approximate alignment with a desired rod under the control of the system controller 26, the misalignment detectors 14, 16 come into play to provide a fine position adjustment that rapidly produces an alignment between the lens and rod with considerably greater precision than is achieved by the system controller. In response to misalignments between a desired rod and its respective lens, the misalignment detectors produce signals which indicate the degree of x,y and preferably also z-axis directional misalignment. These signals are delivered to the lens position control 18, causing it to actuate the lens motors to move the lenses in a direction opposing the detected misalignments. The new lens position then produces a new input for the misalignment detectors, which continue to produce output signals that cause the lens position control to further reduce the misalignment. A negative feedback circuit is thus brought into operation which progressively reduces misalignments between the lenses and their respective rods to low level errors within the tolerances of the misalignment detectors. This fine position adjustment takes place very rapidly, within the time normally allotted for switching between rods in a multiplexing operation. A very precise alignment is thus obtained between the lenses and rods when the optical data samples on the various rods are taken.

Figure 2:
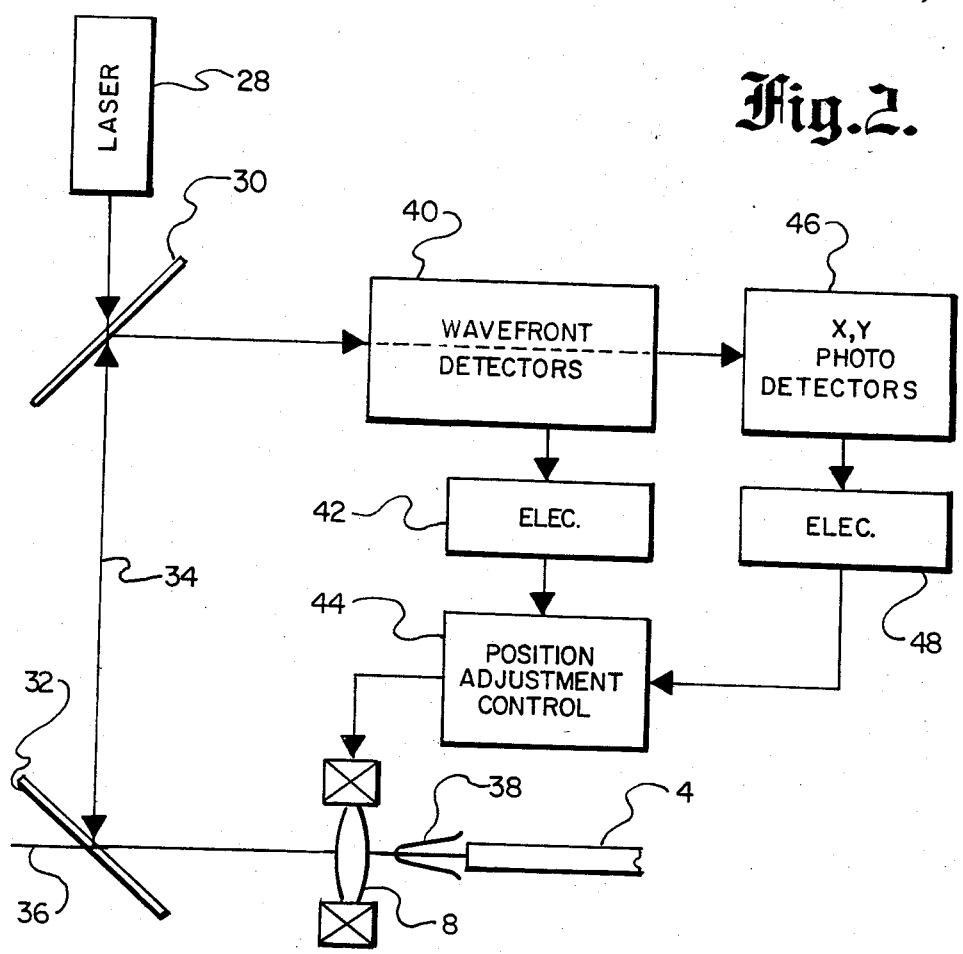
FIG. 2 is a block diagram showing the mechanism for detecting and correcting for misalignments between the optical rods and focusing lens at each end of the system.

Referring now to FIG. 2, a block diagram is presented which shows further details of the preferred embodiment for implementing the lens position control system for the right hand side of the communications system shown in FIG. 1; the lens position control mechanism for the left hand side of FIG. 1 would be essentially identical. The same reference numerals are used as in FIG. 1 for common elements.

The basic approach of this embodiment is to generate an alignment beam which is transmitted along the focal axis of the lens towards the end of the rod with which the lens is to be aligned, and to then sense the light reflected off the end of the rod and back through the lens to determine if the lens and rod are indeed in alignment. As long as there is a misalignment, the alignment beam will not be co-axial with a data beam emitted from the rod, and the reflected alignment beam will form a telltale reflection pattern. Once the lens has been brought into alignment with the rod, the alignment beam transmitted along the lens axis will also be centered on the end of the rod, producing a balanced reflection pattern with maximum luminance to indicate that alignment has been achieved.

An alignment beam is formed from a laser 28 or other suitable source, and transmitted through a one-way mirror 30 to a dichroic mirror 32 that reflects the alignment beam but not the data beam. Laser 28 and dichroic mirror 32 are positioned such that the alignment laser beam 34 is deflected by the mirror 32 along the lens focal axis towards the end of the cable. With a typical data signal wavelength of about 1.3 microns, alignment beam 34 preferably has a wavelength of about 0.82 microns, and dichroic mirror 32 discriminates between the two frequencies so that it transmits approximately 99% of the data beam 36 emitted from the fiber optic rod, but reflects about 80% of the alignment beam 34 onto the lens focal axis. In this embodiment the dichroic mirror is preferably moved by adjustment motor 12 along with lens 8 so that it remains in a fixed position relative to the lens. In this manner the alignment radiation which is reflected off a rod and back through the lens to the mirror is again reflected up along substantially the same path as that followed by the incoming alignment beam 34.

The position of lens 8 relative to the desired rod 4 will determine both the pattern and the total amount of the portion of the alignment beam which is reflected off the end of the rod. As indicated by the small illumination graph 38, the portion of the alignment beam which is reflected off the rod is at a maximum when the alignment beam is in alignment with and centered on the rod, and rapidly tapers off as the lens and mirror 32 are moved to shift the alignment beam off-center from the rod.

The portion of the alignment beam which is reflected off the end of the rod and back through the lens 8 is reflected by dichroic mirror 32 to one-way mirror 30, where it is again reflected to a wavefront detector 40. Numerous other beam deflection systems could, of course, be devised for directing the alignment beam onto the end of the rod and returning radiation reflected through the lens to the detection apparatus. Wavefront detector 40 detects the degree and polarity of the curvature of the reflected radiation wavefront. This information in turn is used to provide an indication of any z-axis misalignment, in which the end of the rod is either forward or back from the lens focal point. As explained in my co-pending patent application Ser. No. 645,914, filed Aug. 28, 1984 and entitled "Method and Apparatus for Observing Surface Topology", the wavelength for a collimated beam such as alignment beam 34 is essentially a straight line perpendicular to the beam axis. When the beam is focused by an element such as focusing lens 8, the wavefront emerging from the lens is curved and convex with respect to the focal point. If the focused beam is then reflected off a surface such as the end of a rod before it has reached the focal point, the wavefront of the reflected beam is also convex with respect to the focal point, although the degree of convexity is reduced as the reflected beam travels back through the lens. If, on the other hand, the focused beam is reflected off a surface located beyond its focal point, the curvature of the reflected beam is concave with respect to the focal point. The third possibility is that the focused beam is reflected from a surface located precisely at the focal point; in this event the reflected radiation has a wavefront curvature which is initially slightly convex with respect to the focal point, but becomes a straight line perpendicular to the beam axis during transit back through the lens. Wavefront detector 40 is a conventional device which is capable of detecting both the degree and direction of curvature of the reflected alignment beam, and thus senses any out-of-focus z-axis misalignment between the lens and rod.

The output of wavefront detector 40 is processed through an appropriate electronics processing circuit 42, which delivers an output signal to a position adjustment control mechanism 44 for lens adjustment motor 12. Since the signal produced by wavefront detector 40 will have both power and wavefront components, and variations in the reflected beam power can distort the z-axis measurement, it is desirable that the electronics 42 include a power detector to sense the power content of the reflected beam, and a normalizer circuit to remove the power component and leave a signal which represents only the wavefront of the reflected beam. This type of normalization is described in my co-pending application Ser. No. 645,914. Electronics circuit 42 produces an output signal that causes the position adjustment control 44 to initiate a z-axis lens movement in a direction opposite to the detected z-axis misalignment. The z-axis adjustment continues until the lens very quickly assumes a z-axis position at which the focal point of lens 8 substantially coincides with the emitting end of rod 4. In this position optical data signals emitted from rod 4 are focused to a collimated beam by lens 8 for transmission to the communications channel. Data signals traveling in the opposite direction are focused by the lens substantially at the end of rod 4, thereby enhancing the transmission efficiency through the rod.

After passing through wavefront curvature detector 40, the reflected alignment beam reaches a photodetector 46 which senses any x-y misalignments between the lens 8 and rod 4. The output of x,y photodetector 46 is processed by an appropriate electronic circuit 48 to produce an output signal from which position adjustment control 44 controls the motor movement so as to oppose detected x,y misalignments. As in the z-axis control, the x,y position correction acts very rapidly to center the lens over the desired rod in the normal time interval between switching from one rod to another.

Figure 3:
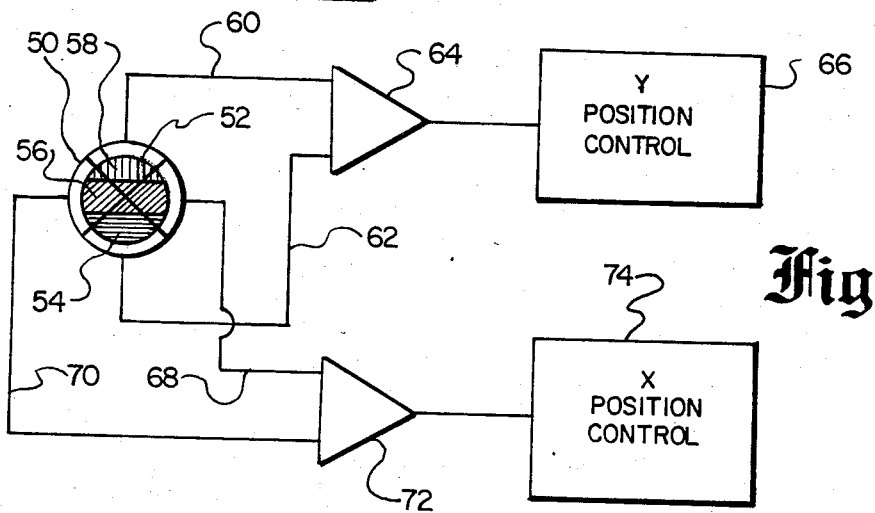
FIG. 3 is a schematic diagram showing one embodiment of the x-y misalignment detection circuitry.

A suitable x,y photodetector mechanism is shown in FIG. 3. A quad optical detector cell 50 is used to detect both the pattern and the absolute illumination of the reflected alignment beam. Quad detector 50 is divided into four quadrants, as shown. It is positioned relative to one-way mirror 30 such that, when lens 8 is centered over rod 4, a balanced circular reflection pattern appears on the quad detector as indicated by the perimeter of reflection circle 52. If the lens is misaligned in the y direction, only a portion of the alignment beam will be returned to photodetector 46, such as the horizontally striped section 54. As the lens is brought into further alignment with the rod, the reflected image on quad detector 50 expands as indicated by diagonally striped portion 56. When the lens has reached full alignment with the rod, a reflected alignment beam incident on the photodetector will encompass the full circle 52, including sections 54, 56 and vertically striped section 58. As can be seen from FIG. 3, the portion of the reflected beam which is incident on the lower quadrant relative to the portion of the beam incident on the upper quadrant can be used as an indication of y directional misalignment, the beam being in y alignment when the illuminated area of the upper quadrant equals that of the lower quadrant. The upper and lower quadrants produce outputs over lines 60 and 62, respectively, the magnitude of each output being proportional to the illumination of that quadrant. The two quadrant outputs are delivered to a differential amplifier 64, which produces a control signal for the y position control portion 66 of lens position adjustment control 44. The output of amplifier 64 indicates both the magnitude and direction of y axis misalignment, although a simple directional misalignment indication could suffice for a single power lens motor that moves the lens at a single speed regardless of the degree of misalignment.

X-axis misalignments are detected in a similar fashion by producing signals over lines 68 and 70 proportional to the illumination on the right and left hand photodetector quadrants, respectively. The signal levels are compared in operational amplifier 72, which delivers a corresponding input to the x-axis portion 74 of the lens position control 18.

The system and method thus described is capable of handling a large number of rods in the cables at each end of the system, while maintaining a considerably closer spacing between adjacent rods than has been practical in the past. This results in much smaller mechanical movements and a corresponding increase in switching speed, to the order of milliseconds. Since the z-axis corrections are generally quite small, any offsets of the reflected alignment beam due to z-axis movement of dichroic mirror 32 will be quite small. The described auto-focusing and auto-alignment techniques result in a transfer of information between discrete data channels at opposite ends of the system with a minimum of interchannel cross-talk and with a conversation of the single mode property of the transmitted fiber optic radiation. The described feedback circuits positively position their respective lenses directly over the ends of the rods in each cable, enabling the lenses to collect substantially all of the optical data information emitted from the rods. The dynamic, high speed servomechanism which initially aligns the lenses with the desired rods continues to operate during the data transmission, thereby maintaining a high quality alignment despite severe vibrations such as might be encountered in an aircraft. The system achieves a high bandwidth, in the range of thousands of kilohertz, in addition to its very high switching speed.

While a particular embodiment of the invention is described, numerous variations and alternate embodiments will occur to those skilled in the art. For example, while a single focusing lens is shown as being used for both data transfer and the alignment beam, separate data and alignment transmission paths might be configured. As another example, the position of a reflected alignment beam might be maintained relative to the misalignment detectors during positional adjustment of the lens by a mechanism other than a dichroic mirror which moves along with the lens. Accordingly, it is intended that the invention be limited only in terms of the appended claims.

I claim:

1. A fiber optic switching system capable of rapidly switching among optical rods fixed in position in a multirod cable for optical connection with a communications channel, comprising:

a lens adapted to focus optical radiation emitted from a rod fixed in position to a beam suitable for transmission by the communications channel, means for adjusting the lens position relative to the fixed rod, position control means adapted to control the position adjusting means to sequentially position the lens at the approximate locations of desired fixed rods in the cable, and means responsive to radiation transmitted from a desired fixed rod through the lens for detecting misalignments between the lens and said fixed rod, the position control means controlling the position adjusting means in response to detected misalignments to adjust the lens position so as to oppose detected misalignments between the lens and fixed rod.

2. The fiber optic switching system of claim 1, the lens, lens adjusting means and misalignment detecting means comprising a feedback circuit for the position control means.

3. The fiber optic switching system of claim 1, wherein the lens has a numeric aperture which is greater than the numeric apertures of the fixed rods.

4. The fiber optic switching system of claim 1, wherein the diameters of the fixed rods are of the same order of magnitude as the spacing between adjacent fixed rods.

5. The fiber optic switching system of claim 4, wherein the rod diameters and spacings between adjacent fixed rods are each in the approximate range of 10-20 microns.

6. A fiber optic switching system capable of rapidly switching among optical rods in a multirod cable for optical connection with a communications channel, comprising:

a lens adapted to focus optical radiation emitted from a rod to a beam suitable for transmission by the communications channel, means for adjusting the lens position relative to the rod, position control means adapted to control the position adjusting means to sequentially position the lens at the approximate locations of desired rods in the cable, means responsive to radiation transmitted from a desired rod through the lens for detecting misalignments between the lens and said rod, the position control means controlling the position adjusting means in response to detected misalignments to adjust the lens position so as to position detected misalignments between the rod and the lens, means for generating an alignment radiation beam, means for directing the alignment beam substantially along the focal axis of the lens onto the rod, and means for directing at least a portion of the alignment beam which is reflected off the rod and back through the lens to the misalignment detecting means, said misalignment detecting means being responsive to the reflected radiation pattern to detect misalignments between the rod and lens.

7. The fiber optic switching system of claim 6, wherein the alignment radiation beam is generated at a different frequency from the channel frequency, and the means for directing the reflected alignment beam is adapted to discriminate between the reflected alignment beam and a channel signal.

8. The fiber optic switching system of claim 7, wherein the wavelengths of the alignment beam and channel signal are approximately 0.82 and 1.3 microns, respectively.

9. The fiber optic switching system of claim 6, said misalignment detecting means including means for detecting three-dimensional misalignments, and the lens adjusting means providing three-dimensional position adjustments.

10. The fiber optic switching system of claim 9, the misalignment detecting means including a wavefront detector adapted to provide an indication of the reflected alignment beam focusing, and thereby an indication of misalignments in the spacing between the lens and rod.

11. A fiber optic switching system capable of rapidly switching among optical rods fixed in position in a multirod cable for optical connection with a communications channel, comprising:

a lens adapted to focus optical radiation emitted from a rod fixed in position to a beam suitable for transmission by the communications channel, means for adjusting the lens position relative to the fixed rod, a coarse position control means controlling the lens adjusting means to position the lens at the approximate position of a desired fixed rod in the cable, means for detecting misalignments between the lens and the desired fixed rod, and a negative feedback circuit coupling the misalignment detecting means with the lens adjusting means to provide fine lens position control.

12. The fiber optic switching system of claim 11, the coarse position control means being adapted to control the lens adjusting means to position the lens at a plurality of selected fixed rods in a programmed sequence, the negative feedback means providing fine lens position control at each sequential lens position.

13. The fiber optic switching system of claim 11, wherein the diameters of the fixed rods are of the same order of magnitude as the spacings between adjacent fixed rods.

14. A fiber optic switching system capable of rapidly switching among optical rods in a multirod cable for optical connection with a communications channel, comprising:

a lens adapted to focus optical radiation emitted from a rod to a beam suitable for transmission by the communications channel, means for adjusting the lens position relative to the rod, a coarse position control means adapted to control the lens adjusting means to position the lens at a plurality of selected rods in a programmed sequence, means for detecting misalignments between the lens and the desired rod, said misalignment detecting means comprising:

(a) means for generating an alignment radiation beam at a frequency which is different from the communications channel frequency, (b) means sensitive to the alignment beam frequency for directing the alignment beam onto the emission end of the rod, (c) means for directing at least a portion of the alignment beam which is reflected off the rod and through the lens to the misalignment detecting means, said misalignment detecting means being responsive to the reflected radiation pattern to detect misalignments between the rod and lens, and a negative feedback circuit coupling the misalignment detecting means with the lens adjusting means to provide fine lens position control at each sequential lens position.

15. The fiber optic switching cricuit of claim 14, wherein the lens has a numeric aperture which is greater than the numeric apertures of the rods.

16. An optical communications system for communicating between individual optical rods fixed in position in first and second multirod cables, comprising:

first and second lenses positioned near the ends of the first and second cables, respectively, said lenses being adapted to be aligned with individual rods fixed in position in their respective cables and to focus optical radiation emitted from the fixed rods to beams suitable for transmission by an optical communications channel, an optical communications channel extending between and aligned with the two lenses for receiving optical radiation from a fixed rod in one cable and transmitting the radiation to a fixed rod in the other cable, first and second means for adjusting the positions of the first and second lenses relative to their respective cables, position control means controlling the first and second lens adjusting means to position the first and second lenses at the approximate locations of desired fixed rods in the first and second cables, respectively, means responsive to radiation transmitted through the first lens from a desired fixed rod in the first cable for detecting misalignments between the first lens and the fixed rod, second means responsive to radiation transmitted through the second lens from a desired fixed rod in the second cable for detecting misalignments between the second lens and the fixed rod, and first and second means coupling the first and second misalignment detecting means with the first and second lens adjusting means, respectively, to adjust the positions of the lenses so as to oppose detected misalignments between the desired fixed rods and their respective lenses.

17. The optical communications system of claim 16, said position control means being adapted to position the lenses at the approximate locations of desired rods fixed in position in their respective cables in a programmed sequence of selected fixed rods.

18. An optical communications system for communicating between individual optical rods in first and second multirod cables, comprising:

first and second lenses positioned near the ends of the first and second cables, respectively, said lenses being adapted to be aligned with individual rods in their respective cables and to focus optical radiation emitted from the rods to beams suitable for transmission by an optical communications channel, an optical communications channel extending between and aligned with the two lenses for receiving optical radiation from a rod in one cable and transmitting the radiation to a rod in the other cable, first and second means for adjusting the positions of the first and second lenses relative to their respective cables, position control means controlling the first and second lens adjusting means to position the first and second lenses at the approximate locations of desired rods in the first and second cables, respectively, means responsive to radiation transmitted throuh the first lens from a desired rod in the first cable for detecting misalignments between the first lens and the rod, second means responsive to radiation transmitted through the second lens from a desired rod in the second cable for detecting misalignments between the second lens and the rod, first and second means coupling the first and second misalignment detecting means with the first and second lens adjusting means, respectively, to adjust the positions of the lenses so as to oppose detected misalignments between the desired rods and their respective lenses, means for generating first and second alignment radiation beams, first and second means for directing the first and second alignment beams substantially along the focal axes of the first and second lenses, respectively, to the desired rods, and first and second means for directing at least a portion of the first and second alignment beams which are reflected off the desired rods and back through the first and second lenses to the first and second misalignment detecting means, respectively, said misalignment detecting means being responsive to their respective reflected radiation patterns to detect misalignments between their respective rods and lenses.

19. The optical communications system of claim 18, wherein the alignment radiation beams are generated at different frequencies from the channel frequency, and the first and second means for directing the alignment beams are adapted to discriminate between their respective reflected alignment beams and a channel signal.

20. The optical communications system of claim 18, the position control means providing a coarse adjustment for the first and second lenses, and the first and second lenses, first and second lens adjusting means, first and second misalignment detecting means and coupling means comprising respective negative feedback circuits providing fine position controls for the first and second lenses.

21. The optical communications system of claim 18, the first and second misalignment detecting means including means for detecting three-dimensional misalignments, and the first and second lens adjusting means each providing three-dimensional position adjustments.

22. The optical communications system of claim 21, the first and second misalignment detecting means including respective wavefront detectors adapted to provide indications of the focusing of their respective reflected alignment beams, and thereby indications of misalignments in the spacings between the lenses and their respective rods.

23. An optical communications system for communicating between individual optical rods in first and second multirod cables, comprising:

first and second lenses positioned near the ends of the first and second cables, respectively, said lenses being adapted to be aligned with individual rods in their respective cables and to focus optical radiation emitted from the rods to beams suitable for transmission by an optical communications channel, and said lenses having numeric apertures greater than the numeric apertures of the rods in their respective cables, an optical communications channel extending between and aligned with the two lenses for receiving optical radiation from a rod in one cable and transmitting the radiation to a rod in the other cable, first and second means for adjusting the positions of the first and second lenses relative to their respective cables, position control means controlling the first and second lens adjusting means to position the first and second lenses at the approximate locations of desired rods in the first and second cables, respectively, means responsive to radiation transmitted through the first lens from a desired rod in the first cable for detecting misalignments between the first lens and the rod, second means responsive to radiation transmitted through the second lens from a desired rod in the second cable for detecting misalignments between the second lens and the rod, and first and second means coupling the first and second misalignment detecting means with the first and second lens means, respectively, to adjust the positions of the lenses so as to oppose detected misalignments between the desired rods and their respective lenses.

24. An optical communications system for communicating between individual optical rods in first and second multirod cables, comprising:

first and second lenses positioned near the ends of the first and second cables, respectively, said lenses being adapted to be aligned with individual rods in their respective cables and to focus optical radiation emitted from the rods to beams suitable for transmission by an optical communications channel, an optical communications channel extending between and aligned with the two lenses for receiving optical radiation from a rod in one cable and transmitting the radiation to a rod in the other cable, first and second means for adjusting the positions of the first and second lenses relative to their respective cables, position control means controlling the first and second lens adjusting means to position the first and second lenses at the approximate locations of desired rods in the first and second cables, respectively, means responsive to radiation transmitted through the first lens from a desired rod in the first cable for detecting misalignments between the first lens and the rod, second means responsive to radiation transmitted through the second lens from a desired rod in the second cable for detecting misalignments between the second lens and the rod, and first and second means coupling the first and second misalignment detecting means with the first and second lens means, respectively, to adjust the positions of the lenses so as to oppose detected misalignments between the desired rods and their respective lenses, said rods in each cable having diameters of the same order of magnitude as the spacings between adjacent rods in those cables.

25. A method of switching an optical connection with a communications channel among a plurality of optical rods in a multirod cable, comprising the steps of:

bringing a lens into approximate optical alignment with a first desired fixed rod and the communications channel, detecting misalignments between said fixed rod and the lens, progressively adjusting the lens position to progressively reduce the detected misalignment, transmitting optical information between the fixed rod and the communications channel through the lens, and sequentially bringing the lens into approximate optical alignment with other desired fixed rods and transmitting optical information between each sequential fixed rod and the communications channel through the lens.

26. The method of claim 25, wherein the lens is moved into approximate optical alignment with each of a plurality of fixed rods in a programmed sequence, misalignments between each of the fixed rods and the lens are detected, and the lens position is progressively adjusted to progressively reduce such misalignments for each of the fixed rods before the lens is moved to the next fixed rod.

27. A method of of switching an optical connection with a communiations channel among a plurality of optical rods in a multirod cable, comprising the steps of:

bringing a lens into approximate optical alignment with a first desired rod and the communications channel, generating an alignment radiation beam at a frequency which is different from the channel frequency, directing the alignment beam substantially along the focal axis of the lens onto the desired rod, detecting the radiation pattern of at least a portion of the alignment beam which is reflected off the rod and back through the lens, thereby detecting misalignments between said rod and the lens, progressively adjusting the lens position to progressively reduce the detected misalignment, transmitting optical information between the desired rod and the communications channel through the lens, and sequentially bringing the lens into approximate optical alignment with other desired rods and transmitting optical information between each sequential rod and the communications channel through the lens.

28. The method of claim 27, wherein the misalignment detecting step includes detecting three-dimensional misalignments, and the progressive lens adjusting step includes the provision of three-dimensional position adjustments.

29. The method of claim 28, wherein the misalignment detecting step includes the step of passing the reflected alignment beam through a wavefront detector to provide an indicator of the reflected alignment beam focusing, and thereby an indication of misalignments in the spacing between the lens and rod.

30. A method of switching an optical connection with a communications channel among a plurality of optical rods in a multirod cable, comprising the steps of:

bringing a lens into approximate optical alignment with a first desired rod and the communications channel, generating an alignment radiation beam at a frequency which is different from the channel frequency, directing the alignment beam substantially along the focal axis of the lens onto the desired rod, detecting the radiation pattern of at least a portion of the alignment beam which is reflected off the rod and back through the lens, initially scanning the lens over the cable, using the alignment beam to detect the approximate locations of the rods, storing the rod location information, using the stored rod location information to move the lens into approximate optical alignment with each of a plurality of selected rods in a programmed sequence, progressively adjusting the lens position at each selected rod location to align the lens with that rod, and transmitting optical information between each selected rod in the programmed sequence and the communications channel through the lens.

* * * * *